US 9,435,426 B2

(12) United States Patent
Ebata et al.

(10) Patent No.: US 9,435,426 B2
(45) Date of Patent: Sep. 6, 2016

(54) SHIFTING-OPERATION DETECTION UNIT

(71) Applicant: Keihin Corporation, Tokyo (JP)

(72) Inventors: Masashi Ebata, Shioya-gun (JP); Nagatomo Harata, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 310 days.

(21) Appl. No.: 14/289,040

(22) Filed: May 28, 2014

(65) Prior Publication Data

US 2015/0000447 A1    Jan. 1, 2015

(30) Foreign Application Priority Data

Jun. 28, 2013  (JP) ................................. 2013-137022

(51) Int. Cl.
  *F16H 59/04*   (2006.01)
  *F16H 61/12*   (2010.01)
  *F16H 59/02*   (2006.01)

(52) U.S. Cl.
  CPC ............ *F16H 59/044* (2013.01); *F16H 61/12* (2013.01); *F16H 2059/0234* (2013.01); *F16H 2059/0239* (2013.01); *F16H 2061/1268* (2013.01); *Y10T 74/2003* (2015.01); *Y10T 477/60* (2015.01); *Y10T 477/70* (2015.01)

(58) Field of Classification Search
  CPC ................... F16H 59/044; F16H 2059/0234; F16H 2059/0239; F16H 61/12; F16H 2061/1268; Y10T 74/2003; Y10T 477/70; Y10T 477/60; Y10T 477/6203; Y10T 477/63385; Y10T 477/63525; Y10T 477/641
  USPC .............................. 74/365; 180/377; 477/169
  See application file for complete search history.

(56) References Cited

U.S. PATENT DOCUMENTS

| 2,952,346 A * | 9/1960 | Costa .................... B60W 10/02 477/85 |
| 5,089,804 A * | 2/1992 | Mimura ................ F16D 48/064 340/438 |
| 2007/0186705 A1* | 8/2007 | Suzuki .................... F16H 61/16 74/335 |
| 2009/0031834 A1* | 2/2009 | Takeuchi ............... B62K 11/14 74/335 |
| 2009/0292429 A1* | 11/2009 | Zenno ................... B60W 10/02 701/56 |

FOREIGN PATENT DOCUMENTS

| DE | 102010015037 A1 * | 10/2011 | ............. F02D 11/02 |
| JP | 2010-120569 A | 6/2010 | |
| JP | 5238464 B2 | 7/2013 | |

* cited by examiner

*Primary Examiner* — Julian Huffman
*Assistant Examiner* — Michael Konczal
(74) *Attorney, Agent, or Firm* — Westerman, Hattori, Daniels & Adrian, LLP

(57) ABSTRACT

In a shifting-operation detection unit, a first detection unit has a first resistor connected in series to a first switch and a second resistor connected in parallel to the first switch and the first resistor, a second detection unit has a third resistor connected in series to a second switch and a fourth resistor connected in parallel to the second switch and the third resistor, and the first detection unit and the second detection unit are connected in series to be connected to correspond to a power supply terminal and a ground terminal of an external device and apply a divided voltage of a voltage of the power supply terminal to the external device via an electric wire, the divided voltage having voltage values corresponding to a shift-up operation and a shift-down operation, respectively.

3 Claims, 3 Drawing Sheets

FIG. 3

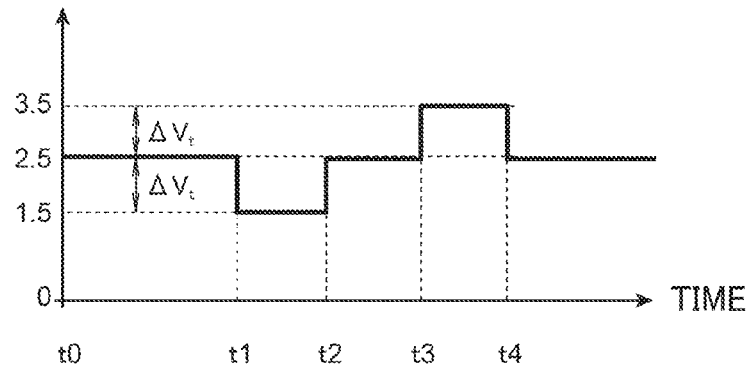

FIG. 4

| STATUS | | DETECTION VOLTAGE [V] | FAULT DETECTION |
|---|---|---|---|
| NEUTRAL | | 2.5 | |
| SHIFT-UP | | 1.5 | |
| SHIFT-DOWN | | 3.5 | |
| FAULT OCCURRING POSITION | FAULT PATTERN | | |
| F1 | BREAKING | 0 | POSSIBLE |
| | GND SHORT-CIRCUITING | 0 | POSSIBLE |
| F2 | BREAKING | 5 | POSSIBLE |
| | Vcc SHORT-CIRCUITING | 5 | POSSIBLE |
| F3 | BREAKING | 5 | POSSIBLE |
| | GND SHORT-CIRCUITING | 0 | POSSIBLE |
| | Vcc SHORT-CIRCUITING | 5 | POSSIBLE |
| F4 | BREAKING | 0 | POSSIBLE |
| | GND SHORT-CIRCUITING | 0 | POSSIBLE |
| | Vcc SHORT-CIRCUITING | 5 | POSSIBLE |
| F5 | BREAKING | 5 | POSSIBLE |
| | GND SHORT-CIRCUITING | 0 | POSSIBLE |
| | Vcc SHORT-CIRCUITING | 5 | POSSIBLE |

SHIFTING-OPERATION DETECTION UNIT

BACKGROUND OF THE INVENTION

The present invention relates to a shifting-operation detection unit, and more particularly relates to a shifting-operation detection unit that detects a shift-up operation and a shift-down operation of a dog transmission in a saddle-ride type vehicle.

In recent years, a dog clutch transmission of a constant mesh type has been adopted as a transmission of a saddle-ride type vehicle such as a motorcycle. This type of transmission has an input shaft that transmits a drive force of an internal combustion via a main clutch and an output shaft that outputs a drive force shifted by the transmission. Gears provided on the input shaft and gears provided on the output shaft rotate while being constantly meshed with each other, and shift gears that horizontally slide on the input shaft and shift gears that horizontally slide on the output shaft are respectively moved by an operation of a shift pedal, so that the shift gears and free gears that are adjacent to the shift gears on the shafts and that idle with respect to the shafts are engaged by dog clutches to transmit power.

Such a transmission adopts a method to detect a shift-up operation and a shift-down operation using a load cell sensor such as a strain gauge. However, because the load cell sensor is expensive and not suitable for mass production, the load cell sensor is exclusively used for saddle-ride type vehicles for racing.

There is another method by which an operation of the shift pedal is detected using switches that function when the shift pedal is operated. Because these switches are not expensive and suitable for mass production, they are used as genuine parts of the saddle-ride type vehicles.

Japanese Patent Application Laid-open Publication No. 2010-120569 discloses a control system that detects an operation of a shift pedal using switches and that controls an output of an engine by an ECU (Engine Control Unit) according to a result of the detection to perform shift-up or shift-down in a saddle-ride type vehicle without using a main clutch.

More specifically, Japanese Patent Application Laid-open Publication No. 2010-120569 discloses the saddle-ride type vehicle that enables an operation of the shift pedal without using the main clutch, with a configuration including a movable member that moves in a shift-up direction, an urging member that is urged in the opposite direction to the shift-up direction, and a first displacement detection switch that detects that the movable member has moved more than a predetermined distance in the shift-up direction against a load applied in the shift-up direction, and also including a movable member that moves in a shift-down direction, an urging member that is urged in the opposite direction to the shift-down direction, and a second displacement detection switch that detects that the movable member has moved more than a predetermined distance in the shift-down direction against a load applied to the shift-down direction.

SUMMARY OF THE INVENTION

However, according to the studies by the present inventors, in cases of a layout where an electrical wire that electrically connects the first displacement detection switch or the second displacement detection switch to an external device such as the ECU is externally exposed and the like, the technique disclosed in Japanese Patent Application Laid-open Publication No. 2010-120569 needs to assume a situation in which a fault such as short-circuiting of the electrical wire due to contact with a foreign substance or breaking of the electrical wire due to hit against a foreign substance occurs. Nevertheless, any configuration for detecting a fault in the external device in these cases is not disclosed. Therefore, it is considered that the external device such as the ECU is likely to execute a control such as changing an output of the engine regardless of the intention of a driver when such a fault occurs.

That is, it is presently in a state where realization of a shifting-operation detection unit having a new configuration that can detect an operation of the shift pedal at the time of shift-up and shift-down using switches which are inexpensive and suitable for mass production and that, assuming also a situation where a fault such as short-circuiting of an electrical wire that electrically connects the shifting-operation detection unit to an external device due to contact with a foreign substance or breaking thereof due to hit against a foreign substance occurs in a layout where the electrical wire is externally exposed, can detect also a fault such as short-circuiting or breaking of an electrical wire that connects the switches for detecting an operation of the shift pedal in the shifting-operation detection unit to the external device is desired.

The present invention has been achieved in view of the above studies, and an object of the present invention is to provide a shifting-operation detection unit that can detect a shifting operation at the time of shift-up and shift-down using switches which are inexpensive and suitable for mass production and can detect a fault such as short-circuiting or breaking of an electrical wire that connects the switches for detecting a shifting operation to an external device.

To achieve the above object, a first aspect of the present invention is to provide a shifting-operation detection unit comprising: a first detection unit provided on a link unit of a shift mechanism, which couples a transmission and a shift pedal both being mounted on a saddle-ride type vehicle to each other to detect a shift-up operation of the transmission in accordance with an operation of the shift pedal and include a first switch; and a second detection unit provided on the link unit to detect a shift-down operation of the transmission in accordance with an operation of the shift pedal and include a second switch. Here, the first detection unit is provided with a first resistor connected in series to the first switch and a second resistor connected in parallel to the first switch and the first resistor, the second detection unit is provided with a third resistor connected in series to the second switch and a fourth resistor connected in parallel to the second switch and the third resistor, and the first detection unit and the second detection unit are connected in series to be connected to correspond to a power supply terminal and a ground terminal of an external device and apply a divided voltage of a voltage of the power supply terminal to the external device via an electric wire. The divided voltage has voltage values corresponding to the shift-up operation and the shift-down operation, respectively.

According to a second aspect of the present invention, in addition to the first aspect, a resistance value of the first resistor and a resistance value of the third resistor are set equal to each other, and a resistance value of the second resistor and a resistance value of the fourth resistor are set equal to each other.

According to a third aspect of the present invention, in addition to the second aspect, the resistance value of the second resistor and the resistance value of the fourth resistor are set smaller than the resistance value of the first resistor and the resistance value of the third resistor.

According to the first aspect of the present invention, in the shifting-operation detection unit comprising: a first detection unit provided on a link unit of a shift mechanism, which couples a transmission and a shift pedal both being mounted on a saddle-ride type vehicle to each other, to detect a shift-up operation of the transmission in accordance with an operation of the shift pedal, and include a first switch; and a second detection unit provided on the link unit to detect a shift-down operation of the transmission in accordance with an operation of the shift pedal, and include a second switch. Here, the first detection unit is provided with a first resistor connected in series to the first switch and a second resistor connected in parallel to the first switch and the first resistor, and the second detection unit is provided with a third resistor connected in series to the second switch and a fourth resistor connected in parallel to the second switch and the third resistor. The first detection unit and the second detection unit are connected in series to be connected to correspond to a power supply terminal and a ground terminal of an external device and apply a divided voltage of a voltage of the power supply terminal to the external device via an electric wire, with the divided voltage having voltage values corresponding to the shift-up operation and the shift-down operation, respectively. Therefore, a shifting operation at the time of shift-up and at the time of shift-down can be detected using the switches which are inexpensive and suitable for mass production and also faults such as short-circuiting and breaking in the electric wires that connect the switches detecting the shifting operation to the external device can be detected.

According to the second aspect of the present invention, a resistance value of the first resistor and a resistance value of the third resistor are set equal to each other, and a resistance value of the second resistor and a resistance value of the fourth resistor are set equal to each other. Therefore, a voltage of a medium value between an upper limit voltage and a lower limit voltage in an output voltage range can be used as a reference voltage of a case where neither the shift-up operation nor the shift-down operation is performed and voltages increased and decreased by the same voltage value from the reference voltage can be set as a detection voltage at the time of shift-up and a detection voltage at the time of shift-down, respectively. Accordingly, timings of an electronic control to change an output of an engine at the time of shift-up and at the time of shift-down can be caused to be the same.

According to the third aspect of the present invention, the resistance value of the second resistor and the resistance value of the fourth resistor are set smaller than the resistance value of the first resistor and the resistance value of the third resistor. Therefore, power consumption in the first detection unit and in the second detection unit can be reduced and heat generation by the first detection unit and by the second detection unit can be suppressed in a state where neither the shift-up operation nor the shift-down operation is performed.

BRIEF DESCRIPTION OF THE DRAWINGS

FIG. 3 is a waveform chart of a voltage signal output from the shifting-operation detection unit according to the present embodiment; and FIG. 4 shows an example of results of fault detection performed by the shifting-operation detection unit according to the present embodiment.

DETAILED DESCRIPTION OF THE PREFERRED EMBODIMENT

A shifting-operation detection unit according to an embodiment of the present invention is explained below in detail with reference to the accompanying drawings.
<Configuration of Saddle-Ride Type Vehicle>

A configuration of a saddle-ride type vehicle to which a shifting-operation detection unit according to the present embodiment is applied is first explained in detail with reference to FIG. 1.

Figure 1:
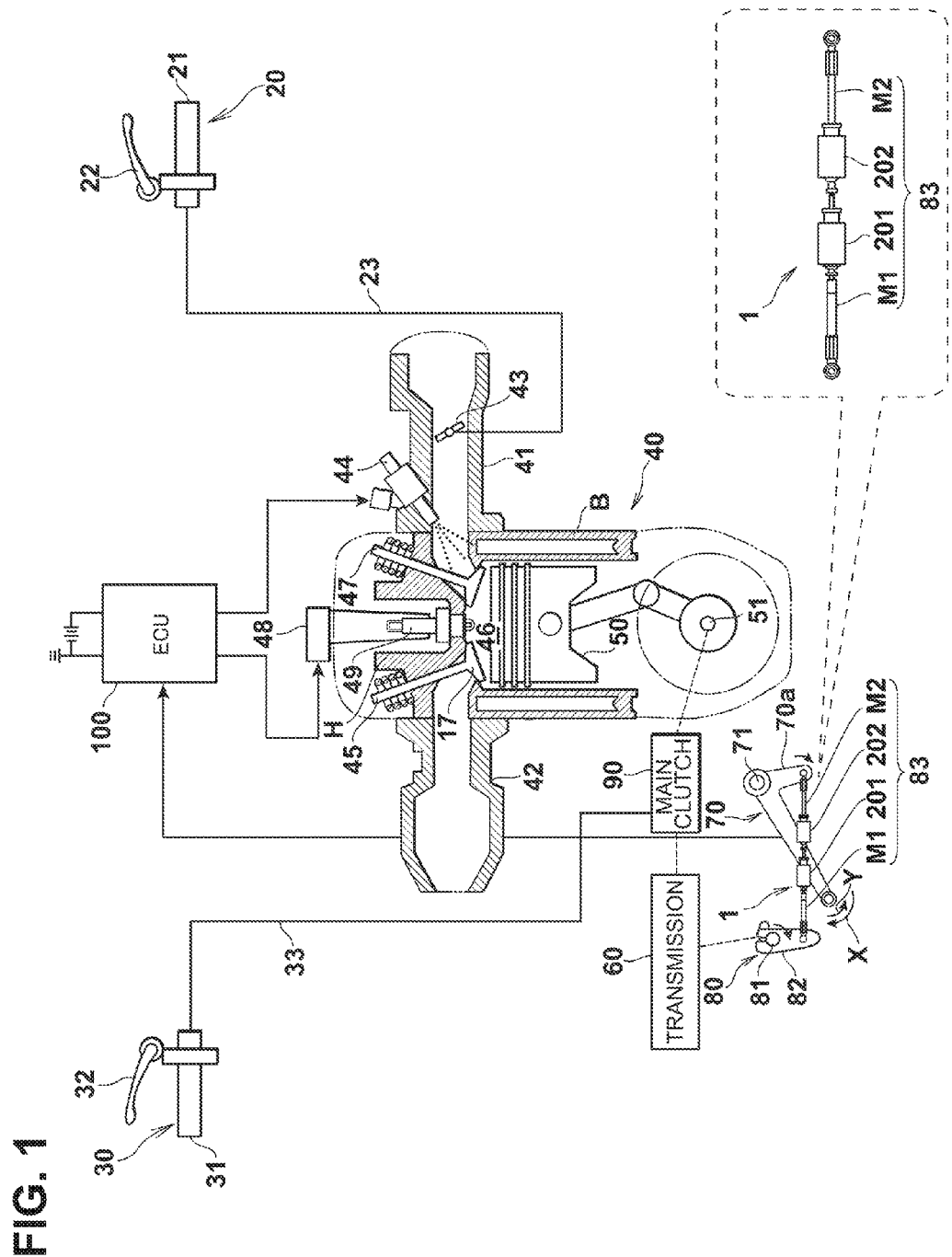
FIG. 1 is a schematic diagram showing a configuration of a saddle-ride type vehicle to which a shifting-operation detection unit according to an embodiment of the present invention is applied, and also shows an enlarged view of the shifting-operation detection unit.

FIG. 1 is a schematic diagram showing a configuration of a saddle-ride type vehicle to which the shifting-operation detection unit according to the present embodiment is applied, and also shows an enlarged view of the shifting-operation detection unit.

As shown in FIG. 1, a saddle-ride type vehicle 10 such as a motorcycle to which a shifting-operation detection unit 1 according to the present embodiment is applied mainly includes a handlebar one-end unit 20, a handlebar other-end unit 30, an engine 40, a transmission 60, a shift pedal 70, a shift mechanism 80, a main clutch 90, and an ECU 100.

The handlebar one-end unit 20 and the handlebar other-end unit 30 are arranged to correspond to opposite ends in a vehicle width direction of a handlebar (not shown) of the saddle-ride type vehicle 10. A throttle grip 21 and a front-wheel brake lever 22 are provided on the handlebar one-end unit 20 and a grip 31 and a clutch lever 32 are provided on the handlebar other-end unit 30.

Typically, the clutch lever 32 is mechanically connected to the main clutch 90 via a clutch cable 33. When operated by a driver, the clutch lever 32 performs disconnection or connection of the main clutch 90, thereby correspondingly blocking or connecting power from the engine 40 to the transmission 60.

The engine 40 includes an inlet pipe 41 and an exhaust pipe 42 fixedly installed to a cylinder head H. A throttle valve 43 mechanically connected to the throttle grip 21 via a throttle wire 23 and an injector 44 are typically provided on the inlet pipe 41. An exhaust valve 45, an inlet valve 47, and a spark plug 49 are provided on the cylinder head H and a combustion chamber 46 is defined in a cylinder block B to which the cylinder head H is fixedly installed. A piston 50 arranged in the cylinder block B is coupled to a crankshaft 51.

The transmission 60 is typically a return-type manual transmission including a dog clutch (not shown). The shift pedal 70 is typically attached to a rotating shaft 71 on the side of the saddle-ride type vehicle 10 to be capable of being operated in an X direction and a Y direction by a toe of the driver, and is connected to the transmission 60 via the shift mechanism 80. The shift mechanism 80 includes an arm 82 capable of rotating around a rotating shaft 81 on the side of the saddle-ride type vehicle 10, and a link unit 83 that couples the arm 82 and the shift pedal 70 to each other. In the link unit 83, a one-end member M1 of the shifting-operation detection unit 1 is coupled to the arm 82 and an other-end member M2 of the shifting-operation detection unit 1 is coupled to an arm portion 70a of the shift pedal 70.

Specifically, when the shift pedal 70 is operated in the X direction or the Y direction by a shifting operation of the driver, the arm 82 of the shift mechanism 80 is rotated via the arm portion 70a of the shift pedal 70 and the link unit 83 of the shift mechanism 80. At that time, in the transmission 60, this rotation of the arm 82 moves a shift fork (not shown) of the transmission 60 and rotates a shift drum (not shown) thereof, thereby selecting a desired gear position. The transmission 60 can be other types than the return type, such as a rotary type.

The main clutch 90 is interposed between the engine 40 and the transmission 60 and disconnects or connects power from the engine 40 to the transmission 60 according to an operation of the clutch lever 32.

The ECU 100 is an electronic control device that executes an electronic control on devices mounted on the saddle-ride type vehicle 10 and includes an arithmetic processing unit such as a CPU (Central Processing Unit) and a memory (which are all not shown). An electric signal from a first detection unit 201 or a second detection unit 202 is input to the ECU 100, and the ECU 100 executes various electronic controls and judges whether there is a fault in the shifting-operation detection unit 1 based on an input predetermined signal.

<Configurations of Shifting-Operation Detection Unit and ECU>

Configurations of the shifting-operation detecting unit 1 and the ECU 100 in the present embodiment are then explained in detail with reference also to FIG. 2.

Figure 2:
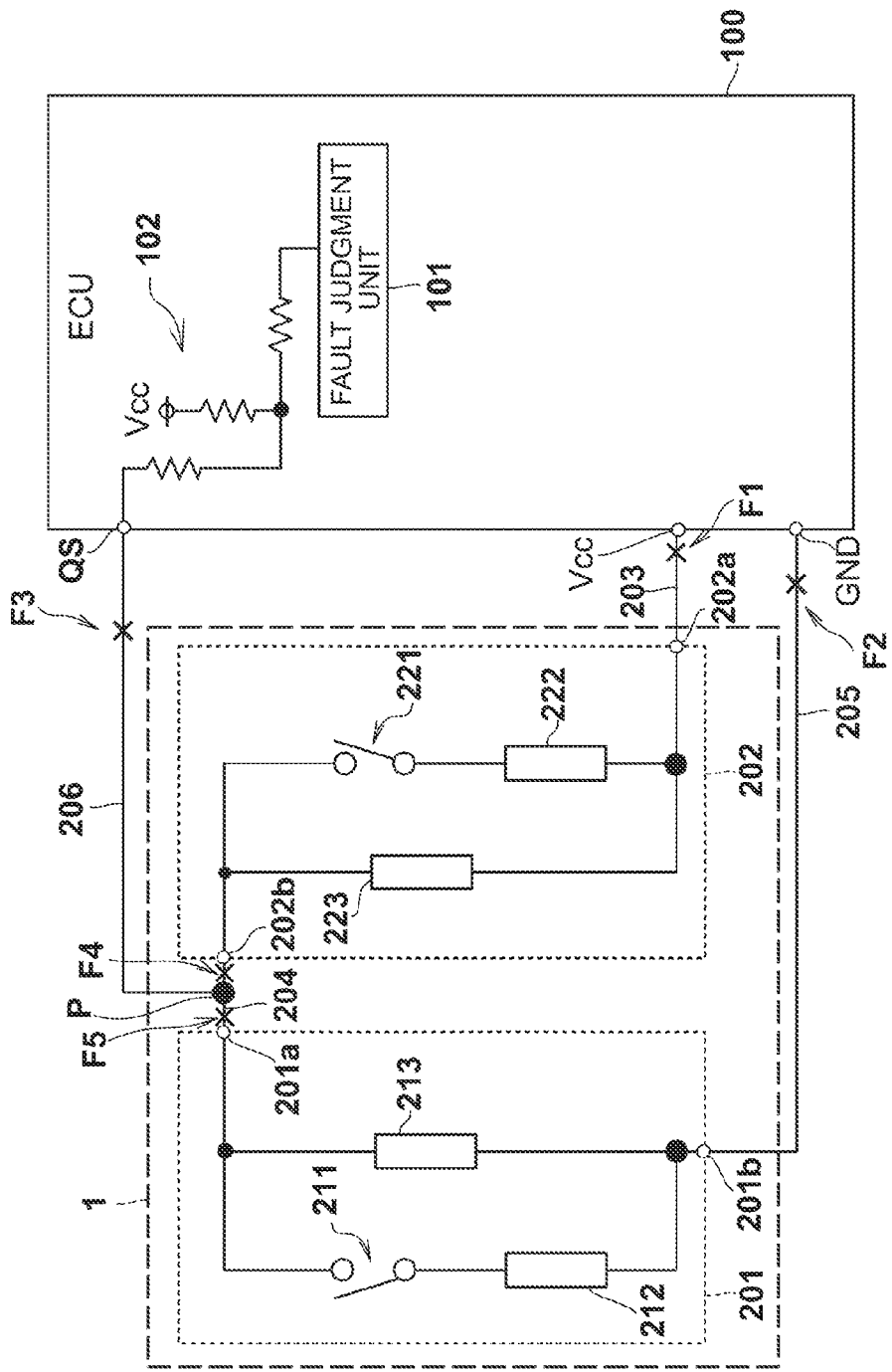
FIG. 2 is a schematic diagram showing configurations of the shifting-operation detection unit and the like according to the present embodiment.

FIG. 2 is a schematic diagram showing configurations of the shifting-operation detection unit 1 and the ECU 100 according to the present embodiment.

As shown in FIG. 2, the shifting-operation detection unit 1 is provided on the link unit 83 and includes the first detection unit 201 and the second detection unit 202 between the one-end member M1 and the other-end member M2. The first detection unit 201 outputs a predetermined electric signal to the ECU 100 when detecting shift-up of the transmission 60 due to an operation of the shift pedal 70. The second detection unit 202 outputs a predetermined electric signal to the ECU 100 when detecting shift-down of the transmission 60 due to an operation of the shift pedal 70. The first detection unit 201 and the second detection unit 202 function as independent units, respectively.

Specifically, the first detection unit 201 has a switch 211, a resistor 212, and a resistor 213 and the second detection unit 202 has a switch 221, a resistor 222, and a resistor 223. The first detection unit 201 and the second detection unit 202 are electrically connected in series between a Vcc terminal as a power supply terminal of the ECU 100 and a GND terminal as a ground terminal thereof via electric wires 203, 204, and 205.

According to a shifting operation of the driver, the switch 211 of the first detection unit 201 is closed at the time of shift-up of the transmission 60 due to an operation of the shift pedal 70 and is opened when the shift pedal 70 is not operated or at the time of shift-down of the transmission 60 due to an operation of the shift pedal 70.

The resistor 212 of the first detection unit 201 is electrically connected in series to the switch 211. The resistor 213 of the first detection unit 201 is electrically connected in parallel to the switch 211 and the resistor 212. It is preferable that the resistor 213 has a resistance value which is set smaller than that of the resistor 212.

According to a shifting operation of the driver, the switch 221 of the second detection unit 202 is closed at the time of shift-down of the transmission 60 due to an operation of the shift pedal 70 and is opened when the shift pedal 70 is not operated or at the time of shift-up of the transmission 60 by an operation of the shift pedal 70.

The resistor 222 of the second detection unit 202 is electrically connected in series to the switch 221. The resistor 223 of the second detection unit 202 is electrically connected in parallel to the switch 221 and the resistor 222. It is preferable that the resistor 223 has a resistance value which is set smaller than that of the resistor 222. It is also preferable that the resistance value of the resistor 212 and the resistance value of the resistor 222 are set equal to each other and that the resistance value of the resistor 213 and the resistance value of the resistor 223 are set equal to each other. In such a case, not only electrical characteristics of the shifting-operation detection unit 1, which are explained in detail later, are obtained but also the first detection unit 201 and the second detection unit 202 can be detection units with the same configuration.

The electric wire 203 electrically connects the Vcc terminal of the ECU 100 and one terminal 202a of the second detection unit 202 to each other. The electric wire 204 electrically connects one terminal 201a of the first detection unit 201 and the other terminal 202b of the second detection unit 202 to each other. The electric wire 205 electrically connects the other terminal 201b of the first detection unit 201 and the GND terminal of the ECU 100 to each other.

An electric wire 206 is bifurcated at a point P on the electric wire 204 and is electrically connected to a QS terminal of the ECU 100. A voltage applied to the QS terminal of the ECU 100 via the electric wire 206 has a value obtained by dividing a power supply voltage supplied from the ECU 100 to the shifting-operation detection unit 1 by a resistance value of the first detection unit 201 and a resistance value of the second detection unit 202.

The ECU 100 has a fault judgment unit 101 as a functional block and has a pull-up circuit 102 between the fault judgment unit 101 and the QS terminal, in addition to the Vcc terminal to which the electric wire 203 is electrically connected, the GND terminal to which the electric wire 205 is electrically connected, and the QS terminal to which the electric wire 206 is electrically connected.

That is, the fault judgment unit 101 is electrically connected to the QS terminal and to a power supply voltage Vcc of the pull-up circuit 102 via resistors and detects a voltage applied to the QS terminal when no fault such as breaking occurs in the shifting-operation detection unit 1. When a fault such as breaking occurs in the shifting-operation detection unit 1, the voltage applied to the QS terminal becomes 0 volt and thus the fault judgment unit 101 detects the power supply voltage Vcc.

<Operations of Shifting-Operation Detection Unit and ECU>

Operations of the shifting-operation detection unit 1 and the ECU 100 having the above configurations in the present embodiment are explained in detail with reference also to FIGS. 3 and 4.

FIG. 3 is a waveform chart of a voltage signal output from the shifting-operation detection unit according to the present embodiment. FIG. 4 shows an example of results of fault detection performed by the shifting-operation detection unit according to the present embodiment.

When it is assumed that the resistance value of the resistor 222 is R1, the resistance value of the resistor 223 is R2, the resistance value of the resistor 212 is R3, and the resistance value of the resistor 213 is R4 (R2=R4<R1=R3) in the first detection unit 201 and the second detection unit 202, the resistance value R1 and the resistance value R3 are set to 450Ω and the resistance value R2 and the resistance value R4 are set to 600Ω as an example. The power supply voltage Vcc is set to 5.0 volts as an example.

As shown in FIGS. 3 and 4, because the driver performs neither a shift-up operation nor a shift-down operation in a section from a time t0 to a time t1, the switch 211 and the switch 221 are both opened so that the resistance value of the first detection unit 201 becomes R4 and that the resistance value of the second detection unit 202 becomes R2. At that time, a voltage obtained by dividing the power supply voltage Vcc by the resistance value R4 of the first detection unit 201 and the resistance value R2 of the second detection unit 202 is 2.5 volts and thus the fault judgment unit 101 detects 2.5 volts in the section from the time t0 to the time t1.

When the driver then performs a shift-up operation in a section from the time t1 to a time t2, the switch 211 is closed while the switch 221 is kept opened, so that the resistance value of the first detection unit 201 becomes a combined resistance value of the resistance values R3 and R4 and that the resistance value of the second detection unit 202 becomes R2. At that time, a voltage obtained by dividing 5.0 volts as the power supply voltage Vcc by the combined resistance value of the resistance values R3 and R4 of the first detection unit 201 and the resistance value R2 of the second detection unit 202 is 1.5 volts and thus the fault judgment unit 101 detects 1.5 volts in the section from the time t1 to the time t2.

Then, because a section from the time t2 to a time t3 is a free time before the next shifting operation and the driver performs neither a shift-up operation nor a shift-down operation, the fault judgment unit 101 detects 2.5 volts as in the section from the time t0 to the time t1.

When the driver performs a shift-down operation in a section from the time t3 to a time 4, the switch 211 is opened while the switch 221 is closed, so that the resistance value of the first detection unit 201 becomes R3 and the resistance value of the second detection unit 202 becomes a combined resistance value of the resistance value R1 and the resistance value R2. At that time, a voltage obtained by dividing 5.0 volts as the power supply voltage Vcc by the resistance value R3 of the first detection unit 201 and the combined resistance value of the resistance values R1 and R2 of the second detection unit 202 is 3.5 volts and thus the fault judgment unit 101 detects 3.5 volts in the section from the time t3 to the time t4.

In this way, by setting the resistance value R2 of the second detection unit 202 and the resistance value R4 of the first detection unit 201 to meet the relation R2=R4, a detection voltage (hereinafter, "reference voltage") of the fault judgment unit 101 at a time when the driver performs neither a shift-up operation nor a shift-down operation can be set to a half of the power supply voltage Vcc. Specifically, the reference voltage can be set to 2.5 volts, which is a half of 5.0 volts as the power supply voltage Vcc, that is, the reference voltage can be set to 2.5 volts as a medium value between 0 volt and 5.0 volts in an output voltage range of the shifting-operation detection unit 1.

Furthermore, by setting the resistance value R1 of the second detection unit 202 and the resistance value R3 of the first detection unit 201 to meet the relation R1=R3, the voltage value increased from the reference voltage at the time of a shift-up operation and the voltage value decreased from the reference voltage at the time of a shift-down operation can be set to the same (ΔVt in FIG. 3). Specifically, the fault judgment unit 101 detects a shift-up operation when detecting 3.5 volts, which is increased by 1.0 volt from 2.5 volts as the reference voltage and detects a shift-down operation when detecting 1.5 volts, which is decreased by 1.0 volt from 2.5 volts as the reference voltage.

As described above, by setting the resistance value R1 of the second detection unit 202 and the resistance value R3 of the first detection unit 201 to meet the relation R1=R3, the ECU 100 can cause a timing to detect a shift-up operation and a timing to detect a shift-down operation to be the same. Accordingly, timings to start a control to change an output of the engine 40 at the time of a shift-up operation and at the time of a shift-down operation can be the same.

Besides, by setting the resistance values R1 and R2 of the second detection unit 202 and the resistance values R3 and R4 of the first detection unit 201 to meet the relation R2=R4<R1=R3, power consumption in the first detection unit 201 and in the second detection unit 202 can be reduced and also heat generation thereby can be suppressed in a state where neither a shift-up operation nor a shift-down operation is performed.

As shown in FIGS. 2 and 4, faults of the electric wires related to the first detection unit 201 and the second detection unit 202 include ones occurring at a portion F1 of the electric wire 203 that electrically connects the Vcc terminal of the ECU 100 and the one terminal 202a of the second detection unit 202 to each other, at a portion F2 of the electric wire 205 that electrically connects the other terminal 201b of the first detection unit 201 and the GND terminal of the ECU 100 to each other, at a portion F3 of the electric wire 206 that is bifurcated at the point P on the electric wire 204 electrically connecting the one terminal 201a of the first detection unit 201 and the other terminal 202b of the second detection unit 202 to each other to be electrically connected to the QS terminal of the ECU 100, and at portions F4 and F5 of the electric wire 204 sandwiching the point P therebetween.

Specifically, examples of a fault at the portion F1 of the electric wire 203 are a case where the electric wire 203 is broken and a case where the electric wire 203 is short-circuited to a different GND potential of the electric wire 205 or the like due to contact of the electric wire 203 with a foreign substance or the like. In the case where such wire breaking occurs, a voltage detected by the fault judgment unit 101 of the ECU 100 becomes 0 volt. In the case where such GND short-circuiting occurs, a voltage detected by the fault judgment unit 101 of the ECU 100 becomes 0 volt. In these cases, the fault judgment unit 101 detects the voltage value different from those detected at the time of a shift-up operation and a shift-down operation and thus can reliably detect the fault.

Examples of a fault at the portion F2 of the electric wire 205 are a case where the electric wire 205 is broken and a case where the electric wire 205 is short-circuited to a different Vcc potential of the electric wire 203 or the like due to contact of the electric wire 205 with a foreign substance or the like. In the case where such wire breaking occurs, a voltage detected by the fault judgment unit 101 of the ECU 100 becomes 5.0 volts. In the case where such Vcc short-circuiting occurs, a voltage detected by the fault judgment unit 101 of the ECU 100 becomes 5.0 volts. In these cases, the fault judgment unit 101 detects the voltage value different from those detected at the time of a shift-up operation and a shift-down operation and thus can reliably detect the fault.

Examples of a fault at the portion F3 of the electric wire 206 are a case where the electric wire 206 is broken, a case where the electric wire 206 is short-circuited to a different GND potential of the electric wire 205 or the like due to contact with a foreign substance or the like, and a case where the electric wire 206 is short-circuited to a different Vcc potential of the electric wire 203 or the like due to contact with a foreign substance or the like. In the case where such wire breaking occurs, a voltage detected by the fault judgment unit 101 of the ECU 100 becomes 5.0 volts. In the case where such GND short-circuiting occurs, a voltage detected by the fault judgment unit 101 of the ECU 100 becomes 0 volt. In the case where such Vcc short-circuiting occurs, a voltage detected by the fault judgment unit 101 of the ECU 100 becomes 5.0 volts. In these cases, the fault judgment unit 101 detects the voltage values different from those detected at the time of a shift-up operation and a shift-down operation and thus can reliably detect the fault.

Examples of a fault at the portion F4 of the electric wire 204, sandwiching the point P with respect to the portion F5, on the side of the other terminal 202b of the second detection unit 202, are a case where such a portion of the electric wire 204 is broken, a case where such a portion of the electric wire 204 is short-circuited to a different GND potential of the electric wire 205 or the like due to contact with a foreign substance or the like, and a case where such a portion of the electric wire 204 is short-circuited to a different Vcc potential of the electric wire 203 or the like due to contact with a foreign substance or the like. In the case where such wire breaking occurs, a voltage detected by the fault judgment unit 101 of the ECU 100 becomes 0 volt. In the case where such GND short-circuiting occurs, a voltage detected by the fault judgment unit 101 of the ECU 100 becomes 0 volt. In the case where such Vcc short-circuiting occurs, a voltage detected by the fault judgment unit 101 of the ECU 100 becomes 5.0 volts. In these cases, the fault judgment unit 101 detects the voltage values different from those detected at the time of a shift-up operation and a shift-down operation and thus can reliably detect the fault.

Examples of a fault at the portion F5 of the electric wire 204, sandwiching the point P with respect to the portion F4, on the side of the one terminal 201a of the first detection unit 201, are a case where such a portion of the electric wire 204 is broken, a case where such a portion of the electric wire 204 is short-circuited to a different GND potential of the electric wire 205 or the like due to contact with a foreign substance or the like, and a case where such a portion of the electric wire 204 is short-circuited to a different Vcc potential of the electric wire 203 or the like due to contact with a foreign substance or the like. In the case where such wire breaking occurs, a voltage detected by the fault judgment unit 101 of the ECU 100 becomes 5.0 volts. In the case where such GND short-circuiting occurs, a voltage detected by the fault judgment unit 101 of the ECU 100 becomes 0 volt. In the case where such Vcc short-circuiting occurs, a voltage detected by the fault judgment unit 101 of the ECU 100 becomes 5.0 volts. In these cases, the fault judgment unit 101 detects the voltage values different from those detected at the time of a shift-up operation and a shift-down operation and thus can reliably detect the fault.

As mentioned above, the difference (one example thereof is 1.5 volts) between the detection voltage for detecting a shift-up operation and the detection voltage for detecting a fault of wire breaking or Vcc short-circuiting (one example thereof is 5.0 volts), and the difference (one example thereof is 1.5 volts) between the detection voltage for detecting a shift-down operation and the detection voltage for detecting a fault of GND short-circuiting (one example thereof is 0 volt) can be caused to be larger than the differences (one example thereof is 1.0 volt) between the reference voltage and the voltages for detecting the shift-up operation and the shift-down operation. Therefore, a fault can be detected more reliably.

According to the configuration of the present embodiment mentioned above, in the shifting-operation detection unit 1 including the first detection unit 201 that is provided on the link unit 83 of the shift mechanism 80, the link unit 83 coupling the transmission 60 and the shift pedal 70 mounted on the saddle-ride type vehicle 10 to each other, detects a shift-up operation of the transmission 60 due to an operation of the shift pedal 70, and has the first switch 211, and including the second detection unit 202 that is provided on the link unit 83, detects a shift-down operation of the transmission 60 due to an operation of the shift pedal 70, and has the second switch 221, the first detection unit 201 has the first resistor 212 connected in series to the first switch 211 and the second resistor 213 connected in parallel to the first switch 211 and the first resistor 212, the second detection unit 202 has the third resistor 222 connected in series to the second switch 221 and the fourth resistor 223 connected in parallel to the second switch 221 and the third resistor 222, and the first detection unit 201 and the second detection unit 202 are connected in series to be connected to correspond to the power supply terminal Vcc and the ground terminal GND of the external device 100 and apply a divided voltage of the voltage of the power supply terminal Vcc, having voltage values corresponding to the shift-up operation and the shift-down operation, respectively, to the external device 100 via the electric wire 206. Therefore, a shifting operation at the time of shift-up and shift-down can be detected using the switches 211 and 221 which are inexpensive and suitable for mass production and also a fault such as short-circuiting and breaking of the electric wire 203 that connects the switches 211 and 221 for detecting the shifting operation to the external device 100 can be detected.

According to the configuration of the present embodiment, the resistance value of the first resistor 212 and the resistance value of the third resistor 222 are set equal to each other and the resistance value of the second resistor 213 and the resistance value of the fourth resistor 223 are set equal to each other. Therefore, a voltage of a medium value between an upper limit voltage and a lower limit voltage in an output voltage range can be used as a reference voltage of a case where neither the shift-up operation nor the shift-down operation is performed, and voltages increased and decreased by the same voltage value from the reference voltage can be set as a detection voltage at the time of shift-up and a detection voltage at the time of shift-down, respectively. Accordingly, timings of an electronic control to change an output of the engine 40 at the time of shift-up and at the time of shift-down can be caused to be the same.

Furthermore, according to the configuration of the present embodiment, the resistance value of the second resistor 213 and the resistance value of the fourth resistor 223 are set smaller than the resistance value of the first resistor 212 and the resistance value of the third resistor 222. Therefore, power consumption in the first detection unit 201 and in the second detection unit 202 can be reduced and heat generation by the first detection unit 201 and by the second detection unit 202 can be suppressed in a state where neither the shift-up operation nor the shift-down operation is performed.

In the present invention, the type, the arrangement, the number, and the like of the constituent elements are not limited to those in the embodiment explained above, and it is needless to mention that the constituent elements can be modified as appropriate without departing from the scope of the invention, such as appropriately replacing these elements by other ones having identical operational effects.

As described above, the present invention can provide a shifting-operation detection unit that can detect a shifting operation at the time of shift-up and shift-down using switches which are inexpensive and suitable for mass production, and that can detect faults such as short-circuiting and wire breaking in electric wires that connect the switches for detecting a shifting operation to an external device. Because of its universal characteristics, applications of the present invention can be expected in a wide range in the field of a shifting-operation detection unit in a vehicle or the like.

The entire content of a Patent Application, No. TOKUGAN 2013-137022 with a filing date of Jun. 28, 2013 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A shifting-operation detection unit comprising:
   a first detection unit provided on a link unit of a shift mechanism, which couples a transmission and a shift pedal both being mounted on a saddle-ride type vehicle to each other, to detect a shift-up operation of the transmission in accordance with an operation of the shift pedal and include a first switch, the first detection unit being provided with a first resistor connected in series to the first switch and a second resistor connected in parallel to the first switch and the first resistor; and
   a second detection unit provided on the link unit to detect a shift-down operation of the transmission in accordance with an operation of the shift pedal and include a second switch, the second detection unit being provided with a third resistor connected in series to the second switch and a fourth resistor connected in parallel to the second switch and the third resistor,
   wherein the first detection unit and the second detection unit are connected in series to be connected to correspond to a power supply terminal and a ground terminal of an external device and apply a divided voltage of a voltage of the power supply terminal to the external device via an electric wire, the divided voltage having voltage values corresponding to the shift-up operation and the shift-down operation, respectively.

2. The shifting-operation detection unit according to claim 1, wherein a resistance value of the first resistor and a resistance value of the third resistor are set equal to each other, and a resistance value of the second resistor and a resistance value of the fourth resistor are set equal to each other.

3. The shifting-operation detection unit according to claim 2, wherein the resistance value of the second resistor and the resistance value of the fourth resistor are set smaller than the resistance value of the first resistor and the resistance value of the third resistor.

* * * * *